(12) United States Patent  (10) Patent No.: US 11,752,440 B2
Braiman  (45) Date of Patent: Sep. 12, 2023

(54) GRIP FOR VIDEO GAME CONTROLLER

(71) Applicant: Robert D. Braiman, Oak Ridge, NC (US)

(72) Inventor: Robert D. Braiman, Oak Ridge, NC (US)

( * ) Notice: Subject to any disclaimer, the term of this patent is extended or adjusted under 35 U.S.C. 154(b) by 0 days.

(21) Appl. No.: 17/193,319

(22) Filed: Mar. 5, 2021

(65) Prior Publication Data
US 2022/0280878 A1 Sep. 8, 2022

(51) Int. Cl.
*A63F 13/98* (2014.01)
(52) U.S. Cl.
CPC .................................... *A63F 13/98* (2014.09)
(58) Field of Classification Search
None
See application file for complete search history.

(56) References Cited

U.S. PATENT DOCUMENTS

| | | | | |
|---|---|---|---|---|
| 4,218,057 A * | 8/1980 | Wilson | ............ | A63B 21/0603 482/109 |
| 4,229,015 A * | 10/1980 | Ramsey | ............ | A63C 11/222 135/66 |
| 4,850,079 A * | 7/1989 | Thompson | ............ | B25D 1/00 16/421 |
| 5,046,739 A * | 9/1991 | Reichow | ............ | G06F 3/039 273/148 B |
| 5,657,985 A * | 8/1997 | Dahlstrom | ............ | A63B 49/08 473/551 |
| 6,120,025 A * | 9/2000 | Hughes, IV | ............ | A63F 13/02 273/148 B |
| D521,092 S * | 5/2006 | Morales | ............ | D21/756 |
| D521,567 S * | 5/2006 | Svendsen | ............ | D14/401 |
| D540,881 S * | 4/2007 | Waugh | ............ | D21/333 |
| D571,367 S * | 6/2008 | Goto | ............ | D14/401 |
| D761,925 S * | 7/2016 | Phelan, Jr. | ............ | D21/753 |
| D808,466 S * | 1/2018 | Foster | ............ | D21/333 |
| D810,202 S * | 2/2018 | Foster | ............ | D21/333 |
| 10,463,977 B1 * | 11/2019 | Houlihan | ............ | A63F 13/98 |
| D870,207 S * | 12/2019 | Ali | ............ | D21/333 |

(Continued)

FOREIGN PATENT DOCUMENTS

GB 2481477 A * 12/2011 .......... H04M 1/0279
WO WO-9936136 A1 * 7/1999 ............ G05G 9/047

(Continued)

OTHER PUBLICATIONS

Sharkuleez, Playbudz! What are they? Do they work?, Aug. 6, 2014, https://www.youtube.com/watch?v=0_eZOCINYek , time 0:00-2:29, p. 1 (Year: 2014).*

(Continued)

*Primary Examiner* — Tramar Harper
(74) *Attorney, Agent, or Firm* — Tuggle Duggins P.A.; Blake P. Hurt

(57) ABSTRACT

A grip for a video game controller has a body with a longitudinal axis, a base section, a finger grip section, and a palm support section, the body defining a cavity oriented along the longitudinal axis cavity therein, the cavity being sized to receive the hand-hold portion of a video game controller therein. The grip functions as a stand to hold the controller upright when placed on a flat surface and provides comfortable support to the user's fingers, palm and thumb pad during play.

18 Claims, 11 Drawing Sheets

(56) References Cited

U.S. PATENT DOCUMENTS

| | | | | |
|---|---|---|---|---|
| D898,544 S | * | 10/2020 | Promo | B25G 1/102 |
| | | | | D8/303 |
| D900,225 S | * | 10/2020 | Morris | D21/333 |
| 10,974,156 B2 | * | 4/2021 | Fletcher | A63F 13/98 |
| 11,065,518 B2 | * | 7/2021 | Sharum | A63B 59/50 |
| 2003/0197680 A1 | * | 10/2003 | Davenport | G06F 3/03543 |
| | | | | 345/163 |
| 2004/0009858 A1 | * | 1/2004 | Tamaribuchi | A63B 21/4017 |
| | | | | 482/121 |
| 2005/0075172 A1 | * | 4/2005 | Coleman | A63F 13/02 |
| | | | | 463/47 |
| 2005/0241111 A1 | * | 11/2005 | Prokop | B26B 3/00 |
| | | | | 16/430 |
| 2007/0034241 A1 | * | 2/2007 | You | A45B 9/02 |
| | | | | 135/25.4 |
| 2008/0032832 A1 | * | 2/2008 | Thomas | A63B 60/10 |
| | | | | 473/549 |
| 2008/0122173 A1 | * | 5/2008 | Harris | A63F 13/02 |
| | | | | 273/148 B |
| 2009/0288693 A1 | * | 11/2009 | Lasota | A61H 3/0288 |
| | | | | 135/86 |
| 2009/0312125 A1 | * | 12/2009 | Kearns | A63B 60/20 |
| | | | | 473/568 |
| 2010/0151975 A1 | * | 6/2010 | Hisle | A63B 60/08 |
| | | | | 473/568 |
| 2010/0178981 A1 | * | 7/2010 | Holcomb | A63F 13/98 |
| | | | | 463/37 |
| 2010/0200721 A1 | * | 8/2010 | Ahn | F16M 13/00 |
| | | | | 248/346.04 |
| 2011/0114656 A1 | * | 5/2011 | Tupy | A47G 23/0225 |
| | | | | 220/729 |
| 2011/0283581 A1 | * | 11/2011 | Freed | F41A 9/65 |
| | | | | 42/71.02 |
| 2012/0148974 A1 | * | 6/2012 | Chester | A61C 7/02 |
| | | | | 433/20 |
| 2014/0200085 A1 | * | 7/2014 | Bares | A63F 13/98 |
| | | | | 463/47 |
| 2016/0041583 A1 | * | 2/2016 | Umezu | G06F 1/169 |
| | | | | 361/679.4 |
| 2017/0165546 A1 | * | 6/2017 | Olds | A63B 60/06 |
| 2017/0165548 A1 | * | 6/2017 | Phelan, Jr. | A63B 60/12 |
| 2017/0189800 A1 | * | 7/2017 | Crain | A63F 13/24 |
| 2018/0311803 A1 | * | 11/2018 | Hertaus | B23D 51/10 |
| 2018/0375977 A1 | * | 12/2018 | Deng | H04M 1/0247 |
| 2019/0046851 A1 | * | 2/2019 | Phelan, Jr. | A63B 59/70 |
| 2019/0054382 A1 | * | 2/2019 | Morris | A63F 13/98 |
| 2019/0351336 A1 | * | 11/2019 | Fletcher | A63F 13/98 |
| 2020/0000195 A1 | * | 1/2020 | Zanxiang | A45C 11/00 |

FOREIGN PATENT DOCUMENTS

| | | | | |
|---|---|---|---|---|
| WO | WO-2015186394 A1 | * | 12/2015 | G06F 3/16 |
| WO | WO-2021040091 A | * | 3/2021 | A63F 13/98 |

OTHER PUBLICATIONS

GamerVets, Review: PS3 Controller Grips with gamegrip technology, Feb. 14, 2012, https://www.youtube.com/watch?v=EVorOiHz5kA, time 0:00-6:20, p. 1 (Year: 2012).*

Retro Game Corps, 3D-Printed Grips for RG350 and RG351 Devices, Mar. 2, 2021, https://www.youtube.com/watch?v=L0P5ThizVUo, time 0:00-0:12:38, p. 1 (Year: 2021).*

Boris 15, Pro Gamer Grips for Xbox One—Product Review, Jan. 23, 2019, https://www.youtube.com/watch?v=EKUYsz9tN4g, time 0:00-9:06, p. 1 (Year: 2019).*

Webpage printout from Amazon showing SquidGrip for PS4 Controllers, print date Aug. 18, 2020.

Webpage printout from Amazon showing KontrolFreek Performance Grips for Playstation 4 Controller (PS4), print date Aug. 18, 2020.

Webpage printout from Amazon showing Dragon Grips for PS4 Controller Grip Set, print date Aug. 18, 2020.

Webpage printout from Venom UK showing Venom Grip Controller Kit, copyright 2020 Venom UK Ltd., print date Aug. 18, 2020.

Webpage printout from Amazon showing eXtremeRate Black Soft Anti-Slip Silicone Cover Skins, print date Aug. 18, 2020.

Webpage printout from Amazon showing MXRC Silicone Rubber Cover Skin, print date Aug. 18, 2020.

Webpage printout from Amazon showing Cybcamo Silicone Skin Cover Grip, print date Aug. 18, 2020.

Webpage printout from Amazon showing Sololife Xbox One Controller Skin Grip Silicone, print date Aug. 18, 2020.

* cited by examiner

US 11,752,440 B2

GRIP FOR VIDEO GAME CONTROLLER

FIELD OF THE INVENTION

The invention herein relates to a video game controller cover, and more specifically to an ergonomic grip for a video game controller with a built-in rest for the same.

DESCRIPTION OF THE PRIOR ART AND OBJECTIVES OF THE INVENTION

Video gaming systems, such as the Xbox and the PlayStation 4, are wildly popular. These systems allow users to operate a variety of video games using a controller. In general, the controller is a device featuring a variety of buttons and a joystick that allow the user to control the action of characters in the video game. Some of the more popular controllers may define a "batwing" shape and are held in the hand or hands of the users, with each hand controlling a respective set of buttons and/or a joystick(s). The controllers are typically fabricated from a plastic material that is relatively hard and non-porous. As a result, the stock controller exterior surface has poor tactile sensation and can be uncomfortable to hold, especially for extended periods of use. As is often the case when playing a video game, the user's actions may become quite animated during play, and during those time(s) the user's grip on the controller may be compromised.

Several attempts have been suggested in the prior art to improve the tactile feel of a controller. For example, devices such as SquidGrip™, KontrolFreak™, Dragon Grips™ and Venom Grip™ are pre-cut covers or wraps that are applied to the grip portions of the controller. These products are typically made of adhesive-backed neoprene, silicone or similar material with a textured surface to improve grip and provide some additional cushioning and improved tactile feel of the controller. The problem with these materials is that they can be difficult to apply properly, can leave adhesive residue on the controller, are known to suffer from delamination or adhesive failure over time and, being quite thin, provide minimal cushioning.

Another prior art approach is exemplified are known as cover skins and supplied by companies such as eXtremeRate, MXRC, Cybcamo, Sololife and others. These cover skins are essentially a one-piece silicone cover that fits over the controller and covers most of the front of the controller as well as the top of the controller where the buttons and joystick(s) are located. Disadvantages for these types of covers are that they often do not fit properly, stretch out over time, are prone to rip or tear when being installed over the controller and can interfere with depressing the buttons on the controller, thus interfering with play.

There is a need for a device to improve grip and tactile feel of a video game controller that is simple to manufacture, provides long term comfort and improved control, is easy to apply and does not interfere with game play.

Thus, in view of the problems and disadvantages associated with prior art devices, the present invention was conceived and one of its objectives is to provide an improved grip for a video game controller which is simple to manufacture and easy to apply.

It is another objective of the present invention to provide an improved grip for a video game controller which is formed with a palm support section and a finger grip section for better hold of the controller.

It is still another objective of the present invention to provide an improved grip for a video game controller which does not interfere with the buttons or joystick(s) on the controller.

It is yet another objective of the present invention to provide an improved grip for a video game controller which provides long term comfort and improved control during use of the controller.

It is a further objective of the present invention to provide an improved grip for a video game controller that provides improved tactile sensation and is comfortable to hold resulting in less hand fatigue.

It is still a further objective of the present invention to provide an improved grip for a video game controller which can be used as a stand to store the controller upright when placed on a flat surface.

Various other objectives and advantages of the present invention will become apparent to those skilled in the art as a more detailed description is set forth below.

SUMMARY OF THE INVENTION

The aforesaid and other objectives are realized by providing in one embodiment, a grip for a video game controller having a body with a cavity defined therein, the cavity being configured (i.e. sized and shaped) to receive the hand-hold portion of a video game controller therein. The cavity is oriented parallel to a longitudinal axis of the body. The body further includes a palm support section, a finger grip section and a base section. The grip functions as a stand to hold the controller in an upright position while providing comfortable support to the user's palm, fingers, and thumb pad during play.

DETAILED DESCRIPTION OF THE PREFERRED EMBODIMENT AND OPERATION OF THE INVENTION

Figure 1:
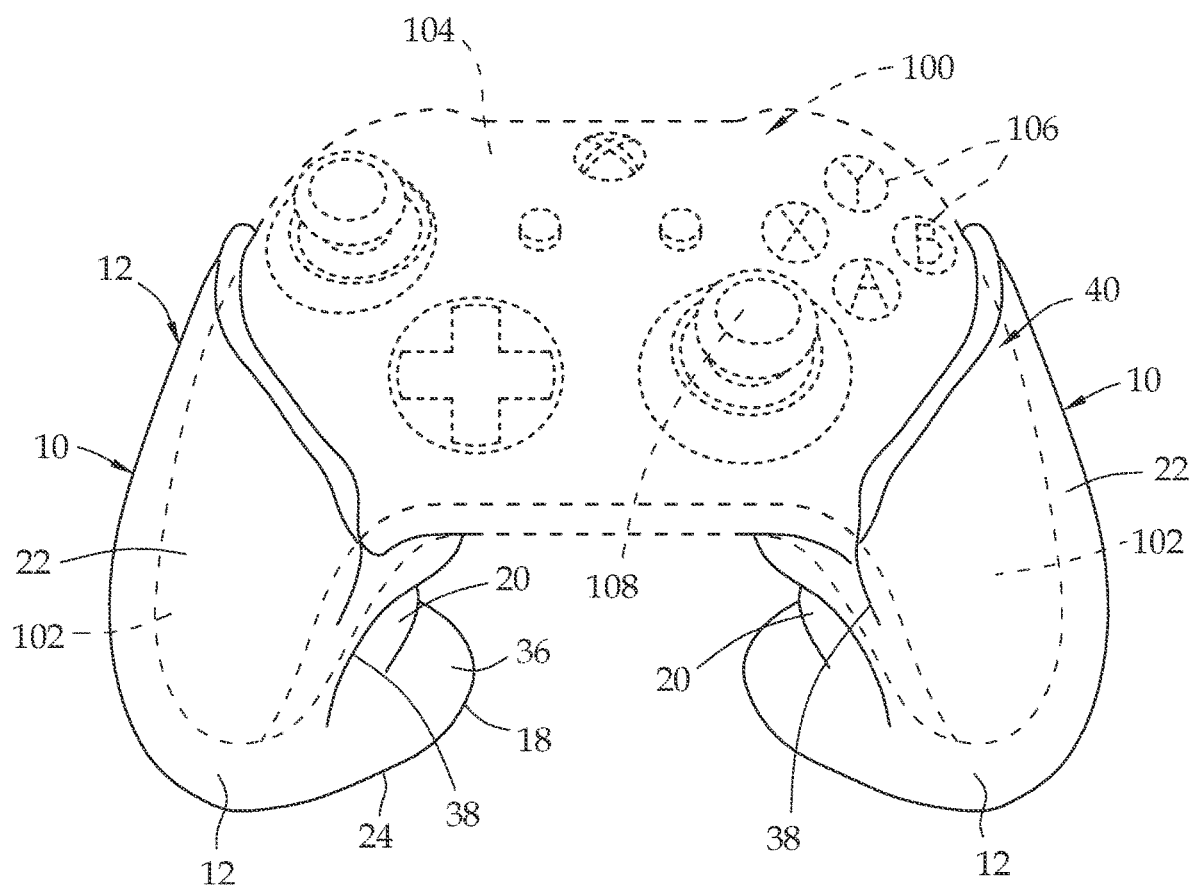
FIG. 1 is as perspective view, partly in phantom, of a controller for a first game system, shown with the grips of the present invention applied thereto.
Figure 2:
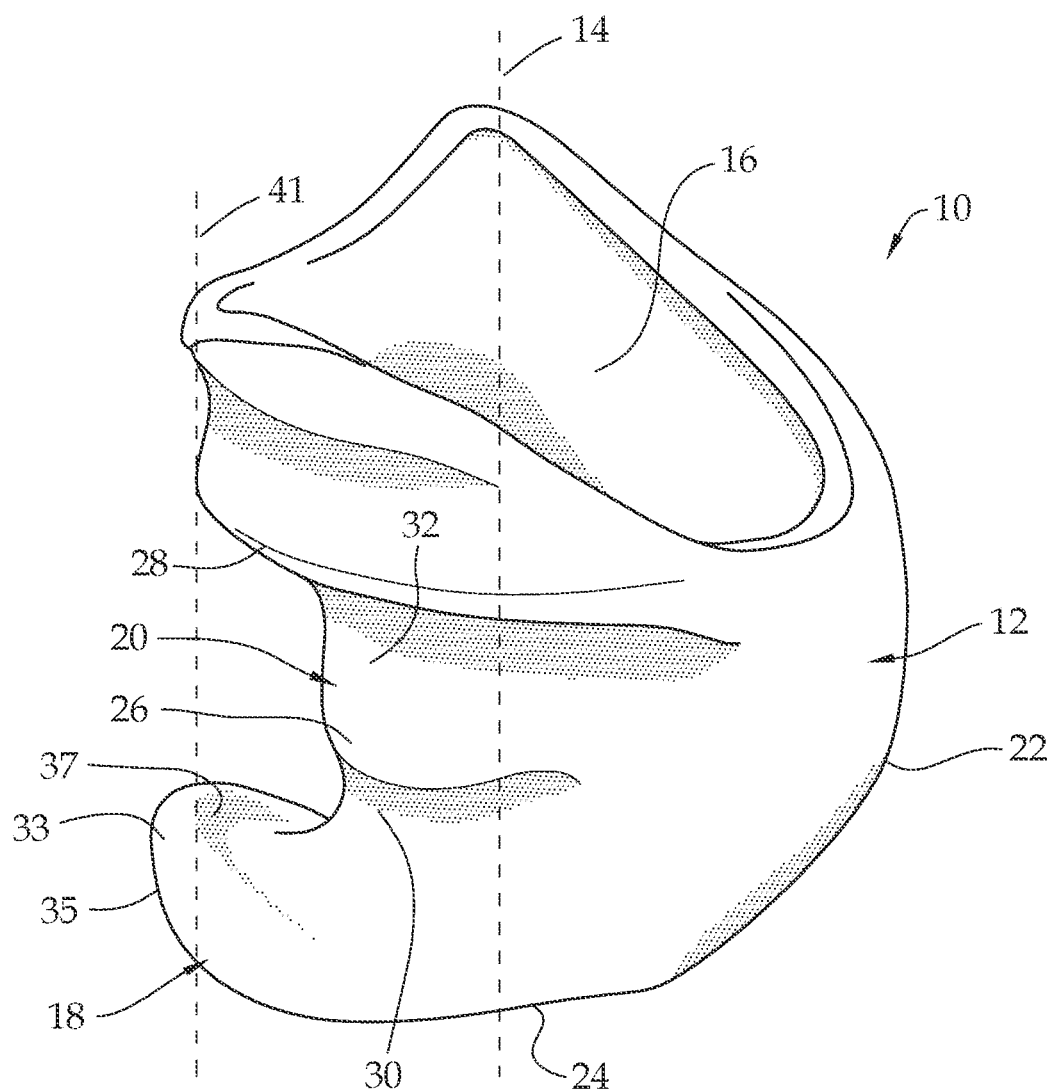
FIG. 2 is a perspective view of a grip for use with a controller for the first game system, specifically showing the grip for the right hand as seen from the left side.
Figure 3:
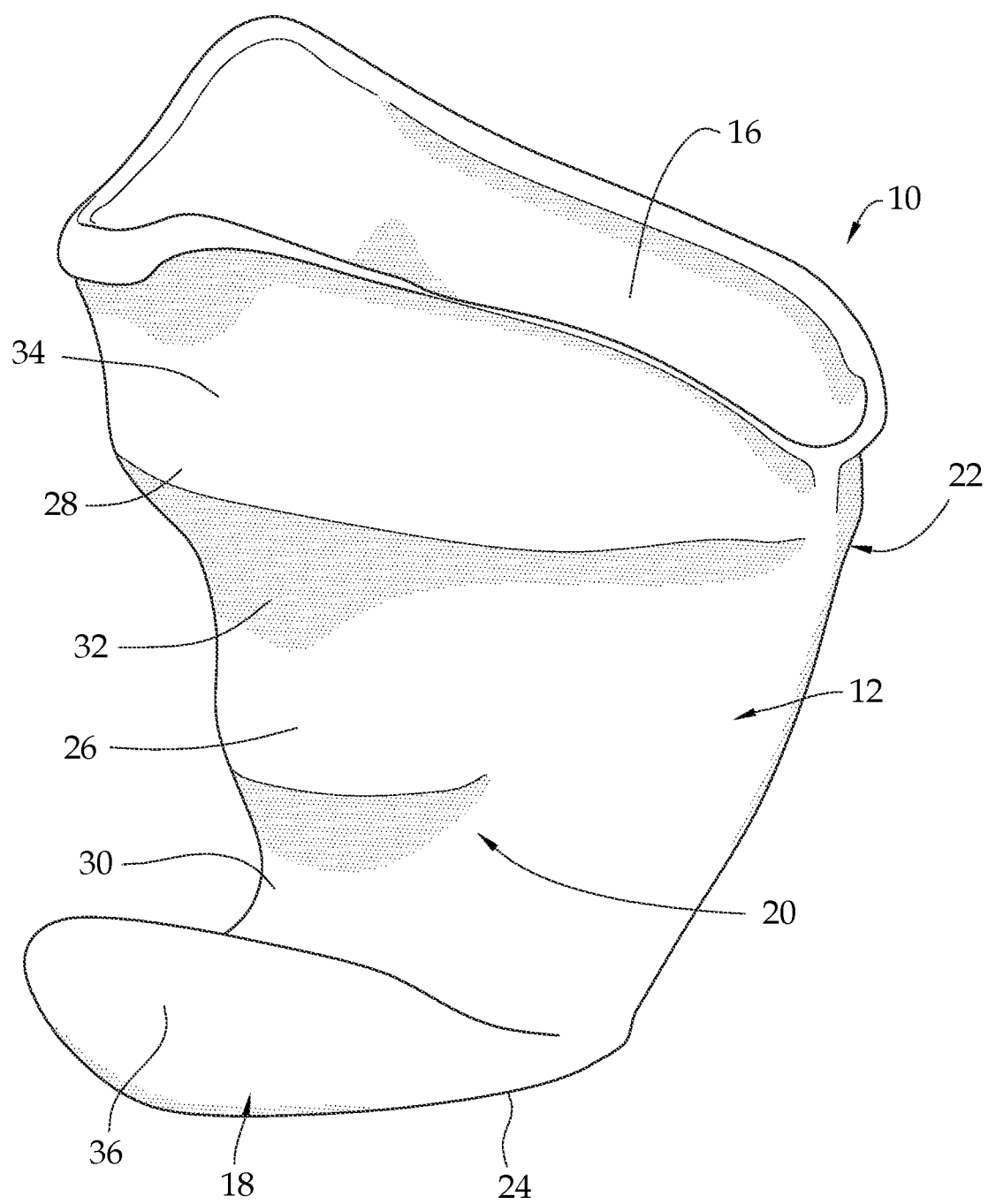
FIG. 3 is a perspective view of the grip of FIG. 2, showing the front and left side of the grip.
Figure 4:
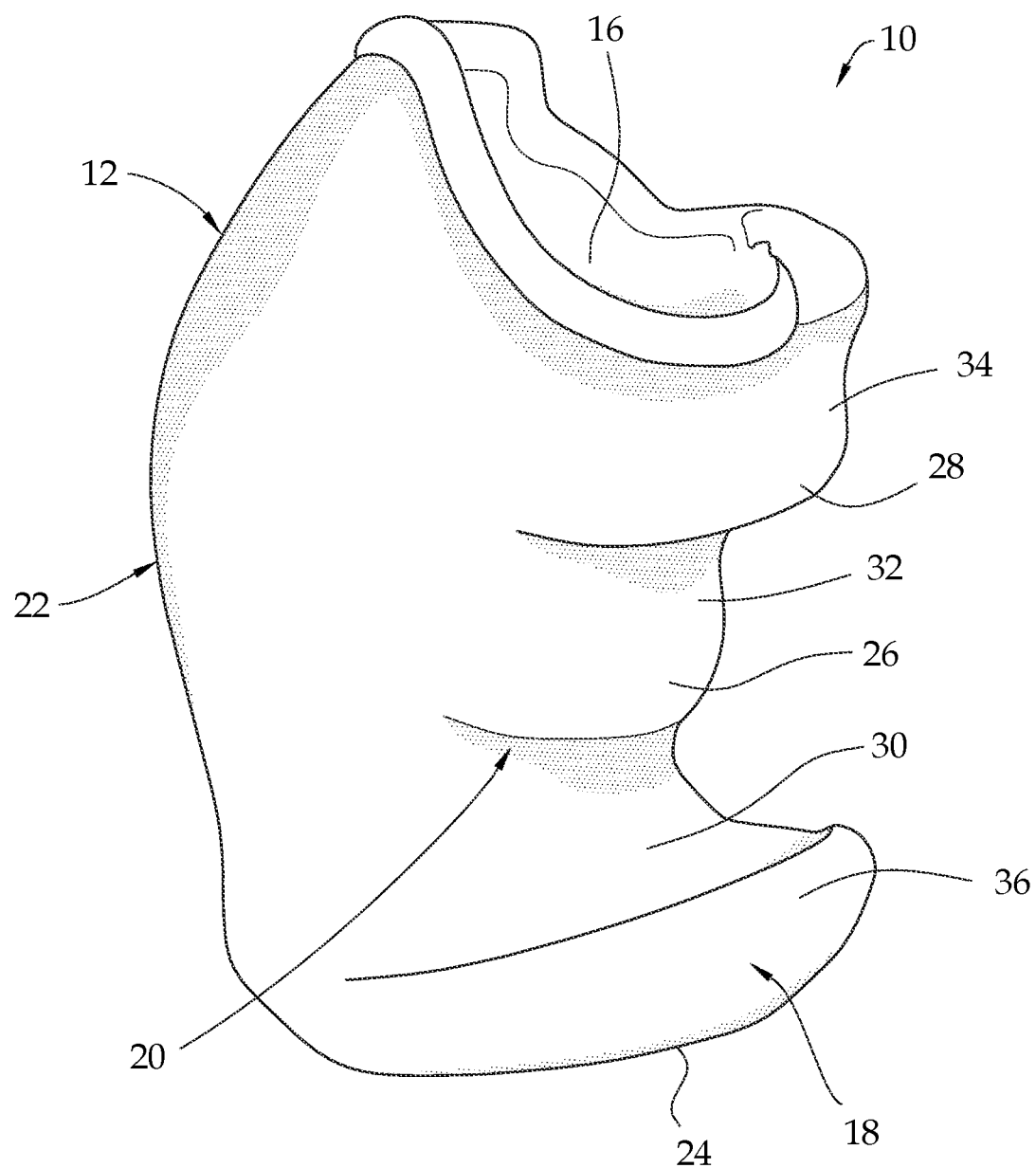
FIG. 4 is a perspective view of the grip of FIG. 2, showing the front and right side of the grip.
Figure 5:
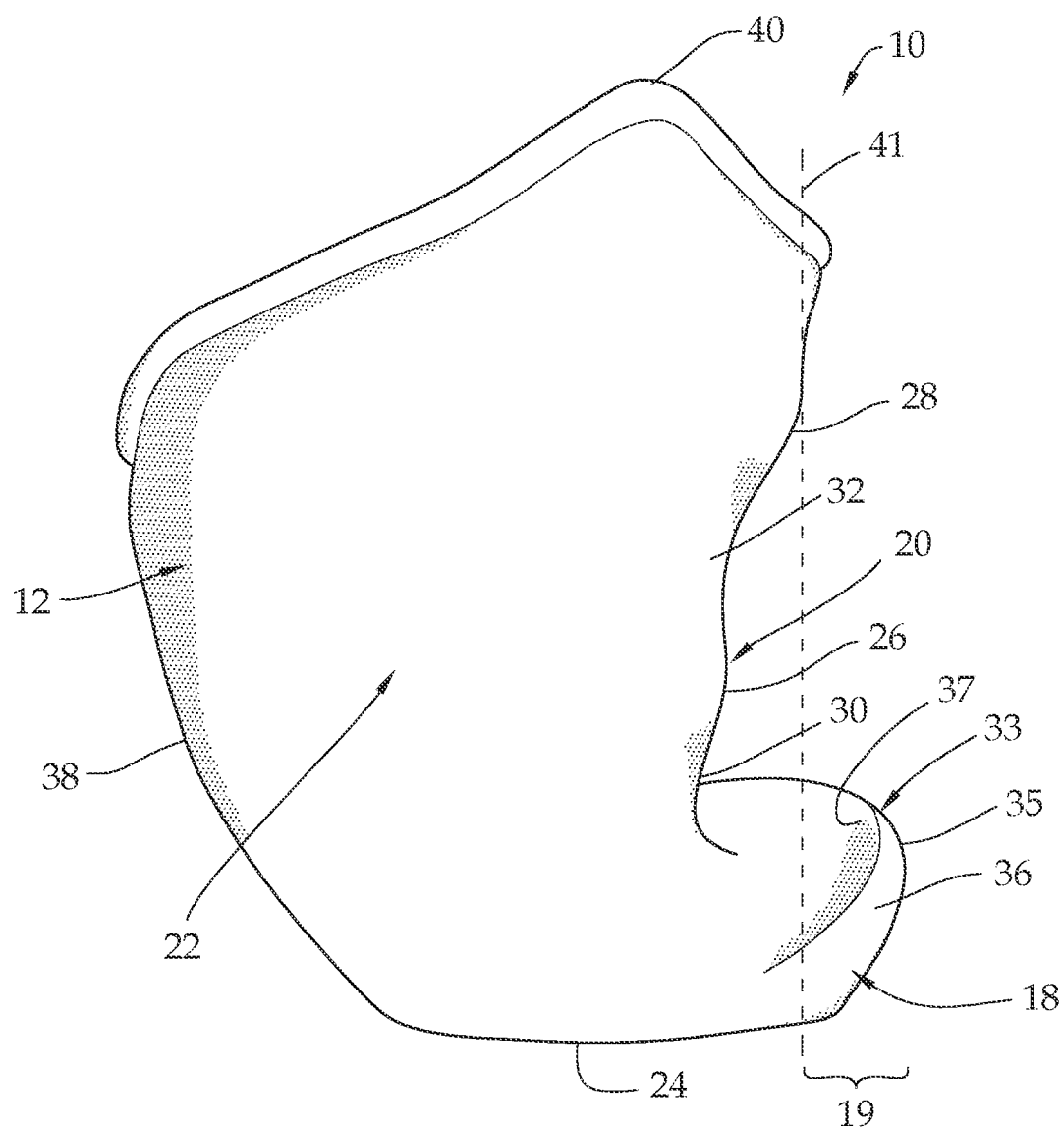
FIG. 5 is a perspective view of the grip of FIG. 2, showing the rear and right side of the grip.
Figure 6:
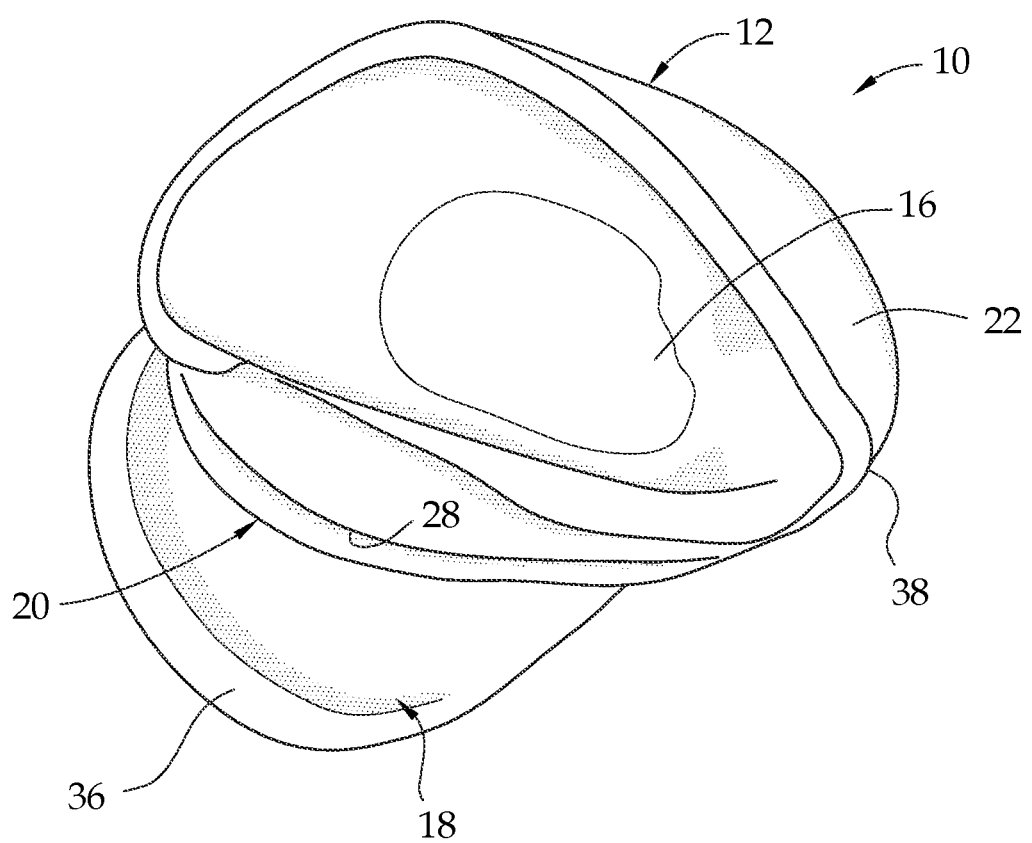
FIG. 6 is perspective of the grip of FIG. 2, showing the top of the grip and particularly illustrating the cavity in the grip.
Figure 7:
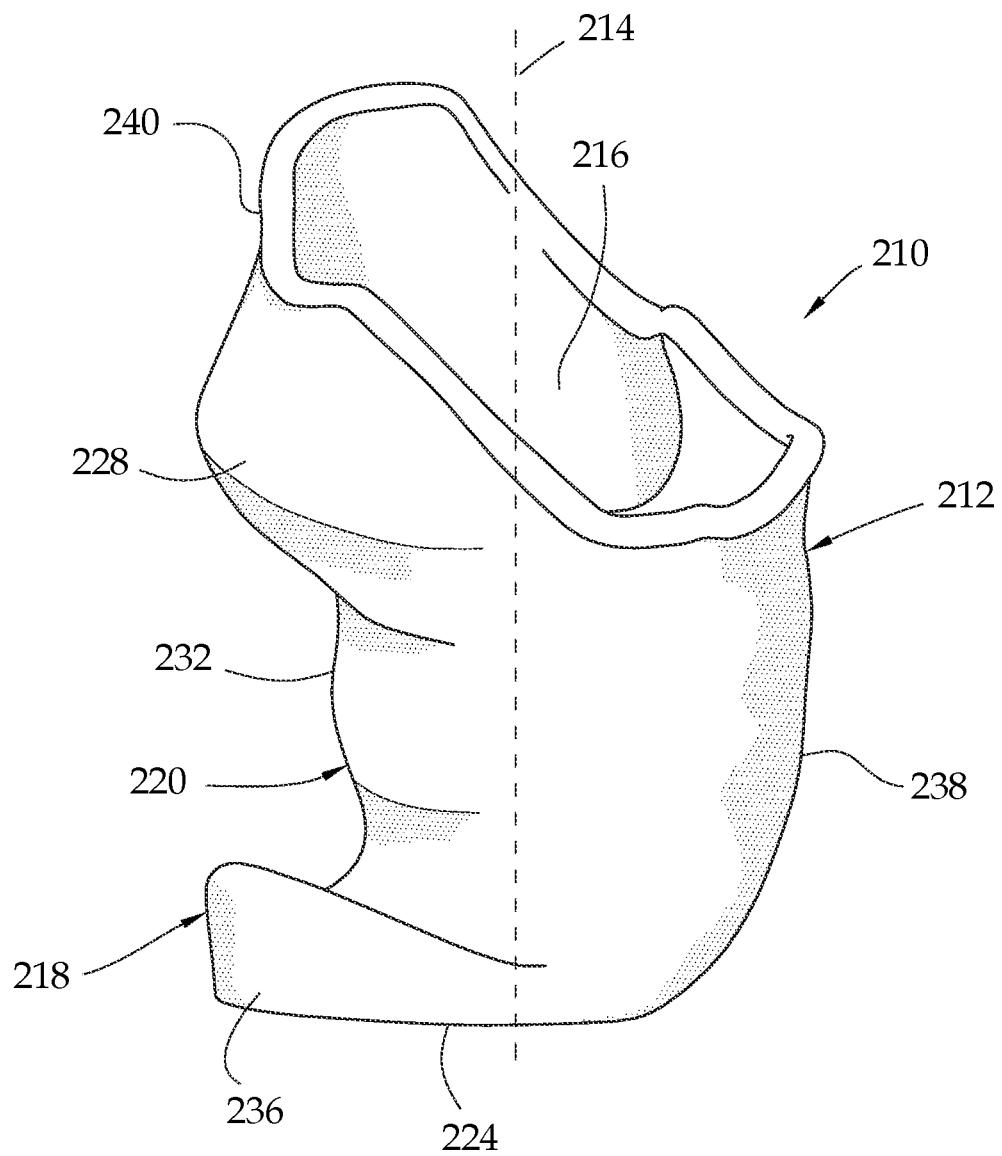
FIG. 7 is a perspective view of a grip for use with a controller for a second game system, specifically showing the grip for the right hand as seen from the left side.

Various exemplary embodiments of the present disclosure are described below. Use of the term "exemplary" means illustrative or buy way of example only, and any reference herein to "the invention" is not intended to restrict or limit the invention to exact features or step of any one or more of the exemplary embodiments disclosed in the present specification. References to "exemplary embodiment", "one embodiment", "an embodiment", "various embodiments", and the like may indicate that the embodiment(s) of the invention so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

The present invention is described more fully hereinafter with reference to the accompanying figures, in which one or more exemplary embodiments of the invention are shown. Like numbers used herein refer to like elements throughout. The invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the invention, and any and all equivalents thereof. Moreover, many embodiments such as adaptations, variations, modifications, and equivalent arrangements will be implicitly disclosed by the embodiments described herein and fall within the scope of the instant invention.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry ad without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has previously been reduced to practice or that any testing has been performed. Likewise, unless stated otherwise, use of verbs in the past tense (present perfect or preterit) is not intended to indicate or imply that the invention has previously been reduced to practice or that any testing has been performed.

For a better understanding of the invention and its use, turning now to the drawings, FIGS. 1-11 illustrate grips for use with a video game controller. The ergonomically advantageous grip provides additional comfort and tactile feel for the user, particularly during extended play, resulting in less hand fatigue, better control of the controller, and more enjoyable play. The grip further can be used as a stand to store the controller upright when placed on a flat surface.

Referring to FIGS. 1-6, illustrated therein is a controller 100 of the type typically used for a first gaming system, for example an Xbox gaming system. The controller 100 (illustrated in phantom) has a pair of hand hold sections 102, one disposed on opposing lateral sides of a central portion 104 containing a variety of buttons 106 and joysticks 108 used for play. Preferred grip 10 fits over each of the respective hand hold sections 102 of the controller. The embodiment of the grip 10 shown in FIG. 1 corresponds to the embodiment illustrated in FIGS. 2-6, whereas the embodiment of FIGS. 7-11 is adapted for use with a controller (not shown) for a second gaming system, for example a PlayStation 4 gaming system.

As is readily apparent when viewing FIG. 1, the grip 10 of the invention preferably changes the overall shape and configuration of the hand hold portions 102 of the controller. This differs from prior art devices which merely add an additional layer of softer material to the controller, but did nothing to change the ergonomic or topographic features of the hand hold sections 102, specifically as it relates to finger position and wrist orientation during use. When using one or more embodiment(s) of grip 10, the user's fingers are less constricted about hand hold sections 102, increasing blood flow to the extremities and reducing joint and muscle fatigue over time. Additionally, or in the alternative, base section 18 permits the user to rest the controller on a flat surface during use, alleviating weight in the user's hands and/or unnecessary rotation of the wrist(s) for extended periods of time.

The preferred embodiment of grip 10 has a unitary body 12 having a longitudinal axis 14. Body 12 preferably defines a cavity 16 that is oriented, and extends along the longitudinal axis 14. The cavity 16 is configured (i.e. sized and shaped) to closely receive therein a hand hold portion 102 of the controller 100. The term "hand hold portion of the controller" is used herein to identify that portion of a gaming controller that the user normally grips in the palm with the hands during play, but may not include the portion(s) of the control that include one or more buttons 106 and/or joystick(s) 108.

The body 12 may include a base section 18, a finger grip section 20, and a palm support section 22. When attached to the controller 100, the grip 10 allows the controller 100 to remain upright when placed on a flat surface, as best seen in FIG. 1. For this reason, it is desirable that the base section 18 defines a generally flat bottom surface 24. In addition, it is preferred that bottom surface 24 of base section 18 has enough surface area to provide a stable support for the controller. It may also be advantageous to create the base section 18 with greater mass and/or a reinforced construction to provide the desired rigidity to the base section 18. Additionally, or in the alternative, body 12 may define a larger, wider, longer, or otherwise more pronounced lip area 36 as described in further detail below. Additionally, or in the alternative, embodiments of body 12 may define one or more recessed grooves, particularly about the exterior periphery of one or more aspects of grip 10.

The finger grip section 20 of grip 10 preferably defines a plurality of spaced-apart ridges 26, 28, defining valleys 30, 32, 34 in the areas between the ridges 26, 28. The ridges 26, 28 and valleys 30, 32, 34 defining spaces to accommodate the fingers of the user when holding the grip 10. In operating a gaming controller, the thumb and index finger of the user are normally required to operate the various buttons 106 and joy sticks 108 on the controller to control the game action, while the remaining fingers are not used. Thus, the ridges 26, 28 and valleys 30, 32 on the finger grip section 20 will preferably be configured to accommodate the middle, ring and little fingers on the hand (not shown). For those times when the index finger is not needed for play, a valley 34 may be provided to accommodate the index finger. In the preferred embodiment, the finger grip section 20, and more preferably ridge 28 terminates at vertical plane 41 which may extend parallel to longitudinal axis 14.

In one or more embodiments, the base section 18 may have an extended forward protrusion 19 (FIG. 5) defining a lip protrusion 33 having upper and lower surfaces 37, 35 respectively that extend away from a flat surface, said extended forward protrusion 19 and lip protrusion 33 forming a lip area 36 (most pronounced in the embodiments of FIGS. 1-6) which can further support the fingers of the user during play and help prevent the user's hand, particularly a little finger of the user, from displacing in one or both of a lateral and longitudinal direction(s) from a controller. Additionally, or in the alternative, the extended forward protrusion 19 and lip protrusion 33 forming lip area 36 is configured to facilitate a user "rolling" the controller slightly forward, while the base section 18 is placed, for example, on the leg of a user. As illustrated in one or more preferred embodiments of grip 10 and/or 210, lip area 36, 236 extends beyond vertical plane 41. This may allow the user to change the angle of the controller and/or permit adjustment of a wrist of the user during gameplay for maximum comfort.

Palm support section 22 is located generally opposite the finger grip section 20 of grip 10. When holding the controller 100, the user's hand is normally curved into a loose first around the grip 10. When curved into a loose fist, the palm of the hand forms a concave surface. To best conform to the shape of the hand during use of the controller, the palm support section 22 has a gentle convex outer surface that corresponds to the curved concave surface of the palm.

The palm support surface 22 is contoured to be narrowest near the base section 18 and widest at the top end 40 of body 12, remote from the base section 18, providing body 12 with an overall shape and appearance of a truncated cone. The wider portions of palm support section 22 at the top end 40 of body 12 provide support for the thumb pad as the user's hand wraps about the grip 10. The configuration of the palm support section 22 forms a ridgeline 38 (FIG. 6) which conforms to the point where the palm and thumb pad of the user joins the wrist, commonly known as the "heel" of the hand. The ridgeline 38 defines a boundary between the palm support section 22 and the finger grip section 20. The grip 10 thus supports the user's entire hand—palm, fingers, thumb pad—while still allowing unrestricted movement of the thumb and index finger to operate the various buttons 106 and joy sticks 108 on the controller 100.

With reference now being made to the embodiments of FIGS. 7-11, the grip 210 shown therein is configured to fit the controller for a second gaming system, for example the PlayStation 4 game system and, apart from cosmetic differences resulting from the different shapes of the respective controllers, is essentially the same as the grip 10 shown in FIGS. 1-6.

The grip 210 has a unitary body 212 having a longitudinal axis 214. Body 212 may define a cavity 216 that is oriented along the longitudinal axis 214. The cavity 216 is configured (i.e. sized and shaped) to closely receive therein a hand hold portion of the controller of the second gaming system.

The body 212 has a base section 218, a finger grip section 220, and a palm support section 222. When attached to the controller, the base section 218 permits the controller to remain upright when placed on a flat surface. For this reason, it is desirable that the base section 218 has a generally flat bottom surface 224. In addition, it is preferred that bottom surface 224 of base section 218 has enough surface area to provide a stable support for the controller. It may also be advantageous to create the base section 218 with greater mass and/or a reinforced construction to provide the desired rigidity to the base section 218. Additionally, or in the alternative, body 212 may define a larger, wider, longer, or otherwise more pronounced lip area 236 as described in further detail below. Additionally, or in the alternative, embodiments of body 212 may define one or more recessed grooves, particularly about the exterior periphery of one or more aspects of grip 210.

Figure 8:
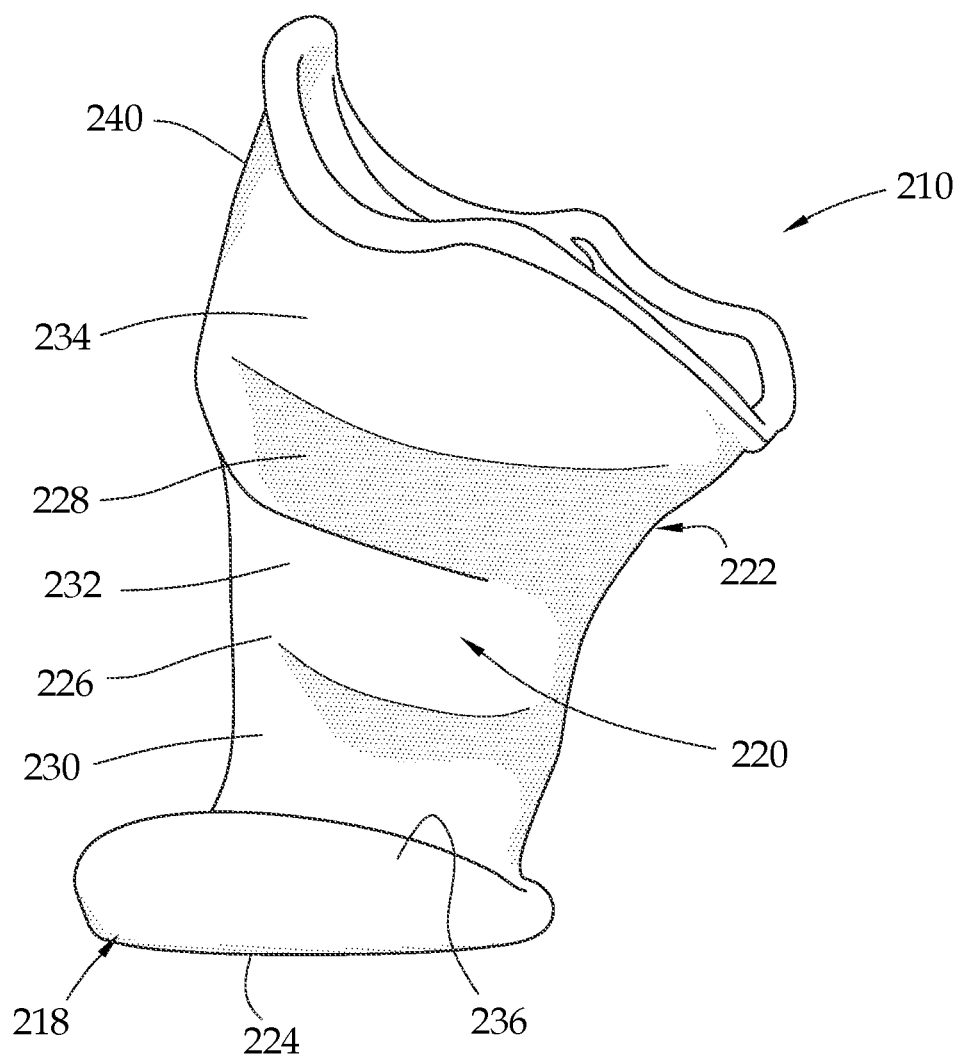
FIG. 8 is a perspective view of the grip of FIG. 7, showing the front and left side of the grip.
Figure 9:
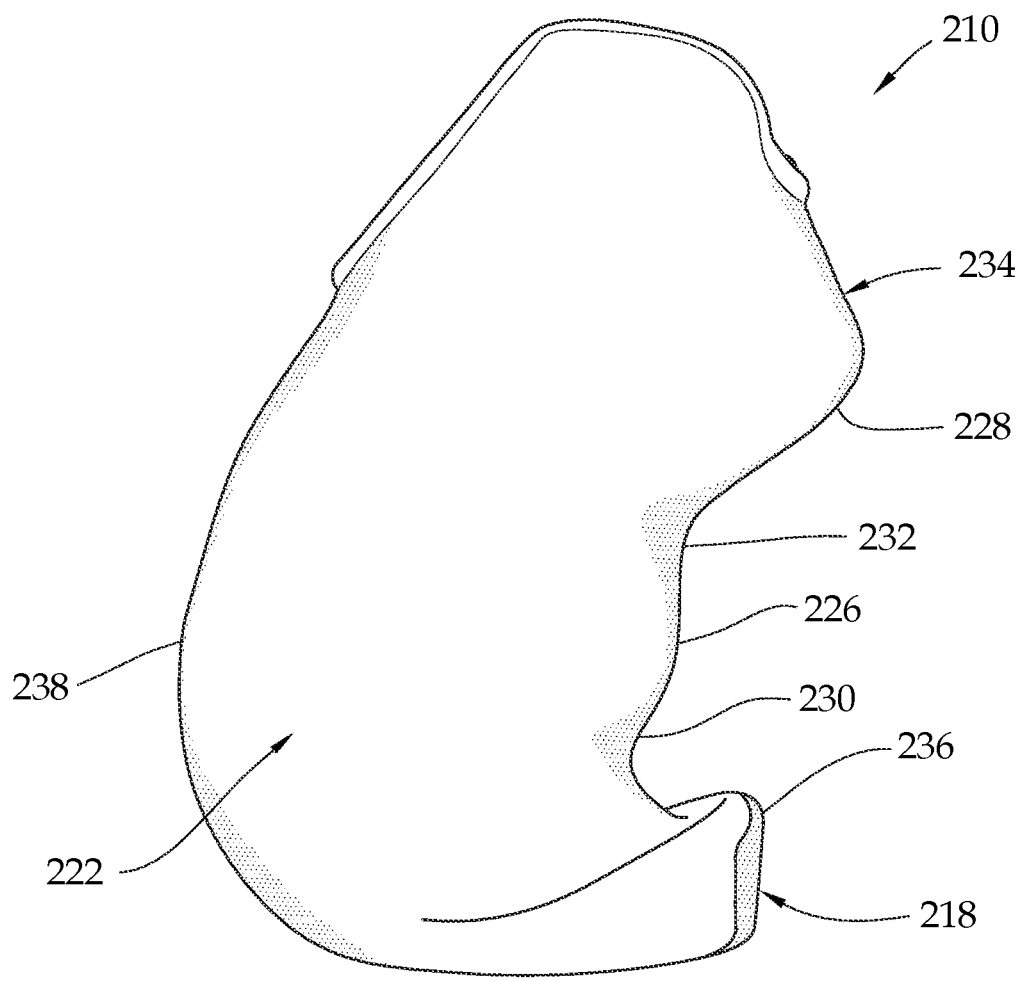
FIG. 9 is a perspective view of the grip of FIG. 7, showing the front and right side of the grip.
Figure 10:
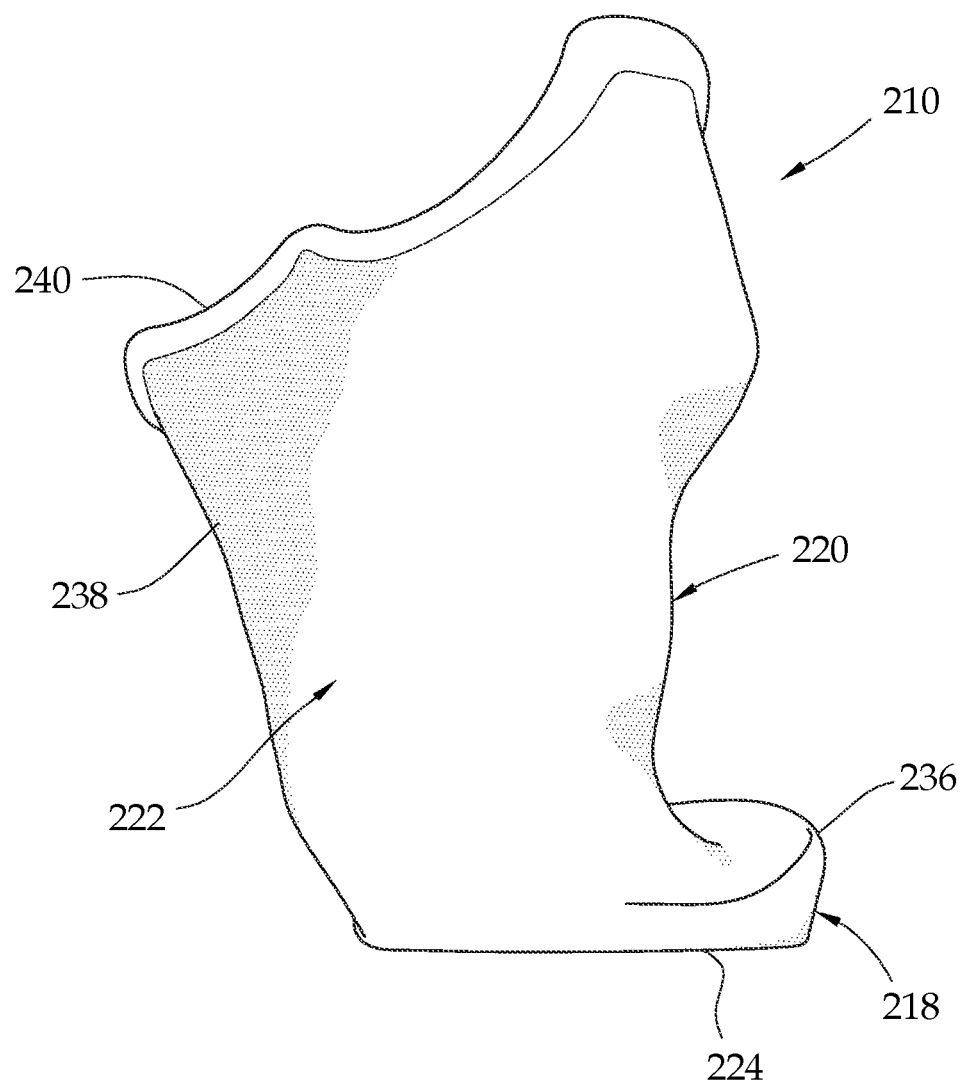
FIG. 10 is a perspective view of the grip of FIG. 7, showing the rear and right side of the grip.
Figure 11:
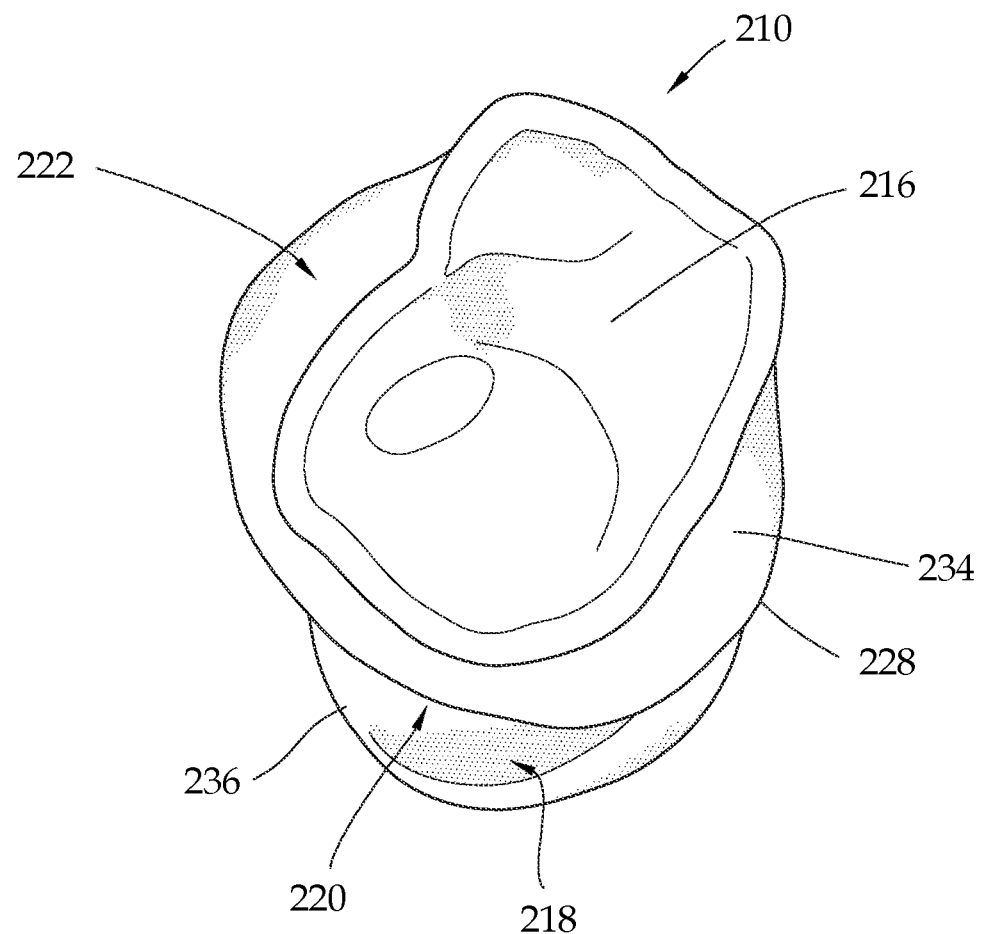
FIG. 11 is perspective of the grip of FIG. 7, showing the top of the grip and particularly illustrating the cavity in the grip.

The finger grip section 220 of grip 210 may define a plurality of spaced-apart ridges 226, 228, defining valleys 230, 232, 234 in the areas between the ridges 226, 228 as seen in FIGS. 8 and 9. The ridges 226, 228 and valleys 230, 232, 234 defining spaces to accommodate the fingers of the user when holding the grip 210. In operating a gaming controller, the thumb and index finger of the user are normally required to operate the various buttons on the controller to control the game action, while the remaining fingers are not used. Thus, the ridges 226, 228 and valley 230, 232 on the finger section 220 will preferably be configured to accommodate the middle, ring and little fingers on the hand. For those times when the index finger is not needed for play, a valley 234 may be provided to accommodate the index finger.

In the embodiment, the base section 218 may have an extended forward protrusion defining a lip protrusion having upper and lower surfaces that extend away from a flat surface, said extended forward protrusion and lip protrusion forming a lip area 236 which can further support the fingers of the user during play and help prevent the user's hand, particularly a little finger of the user, from displacing in one or both of a lateral and longitudinal direction(s) from a controller. The extended lip area 236 also increases the surface area of base section 218, which helps in providing a stable stand when the controller is to be stored upright. Additionally, or in the alternative, the extended forward protrusion and lip protrusion forming lip area 236 is configured to facilitate a user "rolling" the controller slightly forward, while the base section 218 is placed, for example, on the leg of a user. This may allow the user to change the angle of the controller and/or permit adjustment of a wrist of the user during gameplay for maximum comfort.

Palm support section 222 is located generally opposite the finger grip section 220 of grip 210. When holding the controller, the user's hand is normally curved into a loose first around the grip 10. When curved into a loose fist, the palm of the hand forms a concave surface. To best conform to the shape of the hand during use of the controller, the palm support section 222 has a gentle convex outer surface that corresponds to the curved concave surface of the palm.

The palm support surface 222 is contoured to be narrowest near the base section 218 and widest at the top end 240 of body 212, remote from the base section 218, providing body 212 with an overall shape and appearance of a truncated cone. The wider portions of palm support section 222 at the top end 240 of body 212 provide support for the thumb pad as the user's hand wraps about the grip 210. The configuration of the palm support section 222 forms a ridgeline 238 which conforms to the heel of the hand (i.e., the point where the palm and thumb pad meet the wrist). The grip 210 thus supports the user's entire hand—palm, fingers, thumb pad—while still allowing unrestricted movement of the thumb and index finger to operate the various buttons and joy sticks on the controller.

While the grips 10, 210 can be made from several different materials, it is preferred to use a material that offers a pleasant tactile sensation for the user and that is soft and comfortable to hold. Most preferred are natural or synthetic polymers and blends thereof, such as silicone rubber blends. The grips 10, 210 can be made by any suitable process consistent with the materials selected to make the grips, such as casting, molding, 3D printing, etc.

In the drawings and specification there has been set forth preferred embodiments of the invention, and although specific terms have been employed, they are used in a generic and descriptive sense only and not for purposes of limitation, the scope of the invention being defined in the claims. Modifications and alternatives that may suggest themselves to those skilled in the art upon reading the foregoing disclosure are intended to be considered within the scope of the invention.

I claim:

1. A grip for a video game controller of a type having hand hold sections, the grip comprising a unitary body including a finger grip section defining a plurality of spaced-apart ridges defining valleys between the ridges, the valleys and ridges defining spaces sized to receive one or more fingers of a user; and a base section, the unitary body defining a longitudinal axis and the finger grip section terminating at a plane parallel to the longitudinal axis; said unitary body forming a cavity that is oriented along the longitudinal axis; said cavity is sized and shaped to receive therein a hand hold section of the video game controller; the base section configured to serve as a stand to permit the video game controller to remain upright when placed on a flat surface, the base section defining an extended forward protrusion extending beyond the plane parallel to the longitudinal axis, the extended forward protrusion defining a lip protrusion positioned distal the longitudinal axis and beyond the plane parallel to the longitudinal axis, a portion of the extended forward protrusion extending beyond the plane parallel to the longitudinal axis and the lip protrusion further defining upper and lower surfaces that each extend upwardly and away from the flat surface, said extended forward protrusion and lip protrusion forming a lip area to support fingers of a user and prevent a little finger of the user from displacing in one or both of a lateral and longitudinal direction(s) from the video game controller.

2. The grip of claim 1, wherein the base section defines a flat bottom surface.

3. The grip of claim 1, wherein the body further comprises a palm support section.

4. The grip of claim 1, wherein the body further comprises a palm support section and the base section having a flat bottom surface.

5. The grip of claim 1, wherein the body further comprises a palm support section; the base section having a flat bottom surface; wherein the palm support section is positioned opposite the finger grip section and wherein the palm support section has a convex outer surface.

6. The grip of claim 1, wherein the body further comprises a palm support section; the palm support section defining a shape that is narrowest adjacent to the base section and widest at a top end of the body, said top end being remote from the base section.

7. The grip of claim 1, wherein the body further comprises a palm support section; the palm support section defining a shape that is narrowest adjacent to the base section and widest at a top end of the body, said top end being remote from the base section; wherein said palm support section further comprises a ridgeline defining a boundary between the finger grip section and the palm support section.

8. The grip of claim 1, comprising a silicone rubber material.

9. The grip of claim 1, wherein the base section is more reinforced relative to the unitary body.

10. The grip of claim 1, wherein the grip is formed from a natural or synthetic polymeric material.

11. The grip of claim 1, wherein the body further comprises a palm support section; wherein the base section is more reinforced relative to the unitary body and has a generally flat bottom surface; wherein the palm support section is positioned opposite the finger grip section; wherein the palm support section has a convex outer surface; the palm support section defines a shape that is narrowest adjacent to the base section and widest at a top end of the body, said top end being remote from the base section; wherein said body defines a truncated cone shape; wherein said palm support section further comprises a ridgeline defining a boundary between the finger grip section and the palm support section.

12. The grip of claim 1, wherein the body further comprises a palm support section; wherein the base section is more reinforced relative to the unitary body and has a flat bottom surface; said finger grip section having a plurality of spaced-apart ridges defining valleys between the ridges, the valleys and ridges defining spaces sized to receive one or more fingers of a user; wherein the palm support section is positioned opposite the finger grip section; wherein the palm support section has a convex outer surface; the palm support section defines a shape that is narrowest adjacent to the base section and widest at a top end of the body, said top end being remote from the base section; wherein said body defines a truncated cone shape; wherein said palm support section further comprises a ridgeline defining a boundary between the finger grip section and the palm support section.

13. A grip for a video game controller of a type having hand hold sections, the grip comprising a unitary body including a finger grip section and a base section, the unitary body defining a longitudinal axis and the finger grip section terminating at a plane parallel to the longitudinal axis; said unitary body forming a cavity that is oriented along the longitudinal axis; said cavity is sized and shaped to receive therein a hand hold section of the video game controller therein; the base section configured to serve as a stand to permit the video game controller to remain upright when placed on a flat surface, the base section defining an extended forward protrusion extending beyond the plane parallel to the longitudinal axis the extended forward protrusion defining a lip protrusion positioned distal the longitudinal axis and beyond the plane parallel to the longitudinal axis, a portion of the extended forward protrusion extending beyond the plane parallel to the longitudinal axis and the lip protrusion further defining upper and lower surfaces that each extend upwardly and away from the flat surface, the lower surface continuous with the flat surface, said extended forward protrusion and lip protrusion forming a lip area to support fingers of a user and prevent a little finger of the user from displacing in one or both of a lateral and longitudinal direction(s) from the video game controller.

14. The grip of claim 13, wherein the base section defines a flat bottom surface.

15. The grip of claim 13, wherein the base section defines a flat bottom surface and said finger grip section having a plurality of spaced-apart ridges defining valleys between the ridges, the valleys and ridges defining spaces sized to receive one or more fingers of a user.

16. The grip of claim 13, wherein the body further comprises a palm support section.

17. The grip of claim 16, wherein the palm support section is positioned opposite the finger grip section and wherein the palm support section has a convex outer surface.

18. The grip of claim 16, wherein the palm support section further comprises a ridgeline defining a boundary between the finger grip section and the palm support section.

\* \* \* \* \*